United States Patent [19]

Brush

[11] Patent Number: 4,879,731
[45] Date of Patent: Nov. 7, 1989

[54] APPARATUS AND METHOD FOR SYNC DETECTION IN DIGITAL DATA

[75] Inventor: Richard K. Brush, Los Altos, Calif.

[73] Assignee: Ampex Corporation, Redwood City, Calif.

[21] Appl. No.: 235,869

[22] Filed: Aug. 24, 1988

[51] Int. Cl.$^4$ .............................................. H04L 7/04
[52] U.S. Cl. ...................................... 375/116; 375/118
[58] Field of Search ............... 375/113, 114, 116, 118; 370/100, 105, 106

[56] References Cited

U.S. PATENT DOCUMENTS

| | | | |
|---|---|---|---|
| 3,317,669 | 5/1967 | Ohnsorge | 178/69.5 |
| 3,509,278 | 4/1970 | Bergholm | 178/69.5 |
| 3,525,813 | 8/1970 | Taylor et al. | |
| 3,573,634 | 4/1971 | Rachel | 328/63 |
| 3,654,390 | 4/1972 | Puckette | 178/69.5 |
| 3,761,891 | 9/1973 | Markwitz | 340/146.1 |
| 3,854,011 | 12/1974 | Mallory et al. | |
| 3,867,579 | 2/1975 | Colton et al. | |
| 3,887,769 | 6/1975 | Cichetti, Jr. et al. | 178/69.5 |
| 3,903,371 | 9/1975 | Colton et al. | |
| 3,920,900 | 11/1975 | Fineman | 178/69.5 |
| 3,961,311 | 6/1976 | Pavoni et al. | 340/146.1 |
| 4,057,762 | 11/1977 | Namiki | 329/50 |
| 4,203,002 | 5/1980 | Nossen | 375/116 |
| 4,242,755 | 12/1980 | Gauzan | 375/114 |
| 4,298,987 | 11/1981 | Stattel et al. | 375/106 |
| 4,302,831 | 11/1981 | Zemanek | 375/111 |
| 4,340,962 | 7/1982 | Wintzer et al. | 370/100 |
| 4,344,180 | 8/1982 | Cummiskey | 375/11 |
| 4,375,102 | 2/1983 | Van Daal | 375/94 |
| 4,402,080 | 8/1983 | Mueller | 370/100 |
| 4,404,542 | 9/1983 | Thomas, Jr. | 340/146.2 |
| 4,414,677 | 11/1983 | Ive et al. | 375/116 |
| 4,425,646 | 1/1984 | Kinoshita et al. | 371/61 |
| 4,567,587 | 1/1986 | McDermott | 370/13 |
| 4,596,026 | 6/1986 | Cease et al. | 375/118 |
| 4,646,328 | 2/1987 | Riou | 375/114 |
| 4,646,329 | 2/1987 | Bojarski | 375/116 |
| 4,674,088 | 6/1987 | Grover | 370/100 |
| 4,675,886 | 6/1987 | Surie | 375/116 |
| 4,680,766 | 7/1987 | Wilkinson | 371/47 |
| 4,788,681 | 11/1988 | Thomas et al. | 375/114 |

FOREIGN PATENT DOCUMENTS

| | | |
|---|---|---|
| 1919345 | 7/1979 | Fed. Rep. of Germany . |
| 58-162150 | 9/1983 | Japan . |
| 58-162152 | 9/1983 | Japan . |
| 58-172046 | 10/1983 | Japan . |
| 58-177050 | 10/1983 | Japan . |
| 58-201445 | 11/1983 | Japan . |
| 58-201446 | 11/1983 | Japan . |
| 60-240238 | 11/1985 | Japan . |
| 61-65560 | 4/1986 | Japan . |

Primary Examiner—Robert L. Griffin
Assistant Examiner—Marianne Huseman
Attorney, Agent, or Firm—James LaBarre; George B. Almeida; Richard P. Lange

[57] ABSTRACT

Apparatus and method for detecting a sync signal in parallel data which has been reconstituted from serial data. The first occurrence of digital bits which corresponds to a predefined sync signal is recognized and causes the circuitry to shift to a mode of operation in which subsequent sync signals will be recognized if and only if they occur within a predetermined "window" around the expected position of the sync signal. The sync signal is used re-align the parallel data so that the bits are grouped into meaningful words.

23 Claims, 6 Drawing Sheets

APPARATUS AND METHOD FOR SYNC DETECTION IN DIGITAL DATA

FIELD OF THE INVENTION

The present invention relates to the detection of sync patterns in digital data. More particularly, it relates to the detection of sync patterns in digital serial data and to the conversion of the digital serial data to digital parallel data aligned with respect to the detected sync patterns. Such technology is especially useful in digital video tape recorders (DVTRs).

BACKGROUND OF THE INVENTION

Video digital data typically originates in parallel form, but is recorded in serial form. The serial data is then reconstituted in its parallel form during playback. Sync patterns, strings of bits in a predetermined sequence embedded in the serial data at regular intervals, serve as keys for dividing the serial data into the same bytes of parallel bits which constituted the original parallel data. This process may also be conceptualized as the alignment of the byte boundaries with their original positions.

Two phenomena are known to interfere with the proper alignment of the reconstituted parallel data with the original parallel data. The first such phenomenon is the tendency of the sync pattern to "slip," that is, to occur either slightly before or after the end of the normal interval between sync patterns, typically due to "dropouts" occurring between sync patterns. It is therefore desirable that a sync detection circuit be able to recognize a sync pattern despite Bit slippage within an acceptable range to avoid loss of video data.

The other phenomenon is the erroneous failure of any recognizable sync pattern to occur at all at the beginning of a block, typically due to errors or dropouts occurring in the vicinity of the sync pattern. It is possible that video data is still present despite the absence of one or even several sync patterns. It is therefore desirable to provide a sync detection circuit which can continue to operate normally despite a failure to detect a sync pattern for a predetermined period of time after the normal interval between sync pulses.

It is further the case that conventional sync detection circuitry generally operates at a serial data rate rather than at a slower parallel data rate. Such circuitry therefore typically requires high-speed logic which in turn requires more power, and is less suitable for LSI integration, than logic adapted to operate at a slower parallel clock rate. It is therefore also desirable to provide a sync detection circuit in which most if not all of the circuitry operates at a parallel clock rate.

Toward this end, it is known as a first step to convert the incoming serial data to parallel data words without regard to proper alignment. Sync detection is then performed upon the parallel data at the parallel clock rate. A device such as a funnel shifter then shifts the parallel data into its original alignment using the position of the detected sync pattern as a guide. Such a system is disclosed, for example, in U.S. Pat. No. 4,414,677. The particular technique disclosed in this patent, however, involves identifying various repeating patterns spaced at one block intervals. This requires a substantial amount of memory (typically four or more sync blocks long) to retain data while a sync signal is sought. It is also necessarily dependent on the assumption that sync patterns will be equally spaced in the data stream, so that it cannot utilize "preamble" sync patterns, occurring at intervals shorter than normal blocks, to increase the reliability of detecting the first data sync block of a sector recorded on tape.

U.S Pat. No. 4,646,328 discloses a sync detection scheme in which data is processed at one third the serial byte rate, thus reducing the need for high speed logic. The basic approach, however, appears unsuitable for processing at any other rate. The technique disclosed in this patent is therefore probably not suitable for DVTR, where data is typically organized in 8-bit bytes.

U.S. Pat. No. 4,680,766 discloses a system for decoding and checking a sync block address. This effort is necessitated by the use of a data format which requires that the address be decoded independently with very high reliability to decode the rest of the block. Implementing this scheme requires three separate funnel or barrel shifters.

SUMMARY OF THE INVENTION

There is thus a need for a device in which sync detection and conversion to properly aligned data may be performed at a parallel clock rate, thus permitting use of lower speed logic, reducing power dissipation, and facilitating large scale integration, while at the same time providing a flexible and sophisticated response to a displacement or absence of sync signals. This need is met in the present invention through the provision of means, responsive to incoming digital data, for identifying a sync pattern in the data, for generating a first signal in response to a condition in which the sync pattern occurs at a position in the digital data within a window about an expected position, and for setting the width of the window in accordance with the value of a threshold signal. The threshold signal is generated by generating means in such a fashion as to cause the window to have a first width if a sync pattern has been found in the window during a predefined interval, or a second width greater than the first width if no sync pattern has been found in the window in the predefined interval.

Expressed in different terms, the invention includes means arranged to receive parallel data, for detecting a sync pattern in the parallel data, for generating a sync pulse in response to the detection of the sync pattern, and for determining an actual position of the sync pattern and generating a position signal indicative of the position. The invention also includes means, arranged to receive the position signal, for comparing the actual position with an expected position indicated by an expected position signal and for generating a slip signal indicative of a degree of slip between the expected position and the actual position. The slip signal is provided to first signal generating means, which generates a sync-in-window signal when the degree of slip is within an acceptable window. Second signal generating means generates a syncfound signal in response to the presence of both the sync pulse and the sync-in-window signal. The syncfound signal causes the latching means to latch the position signal and so to generate a shift signal in response to the syncfound signal and also supply the shift signal to the comparing means. The third signal generating means generates a select signal indicative of the word count at which sync pattern is expected and supplies i to the comparing means. The expected position signal is based on the shift signal and the select signal. The third signal generating means also generates a threshold signal having a value indicative of the acceptable window, and supplies the threshold signal to the first signal generating means to set the acceptable window. The threshold signal is caused to assume a first value if the syncfound signal is found in a predefined interval, and to assume a second value greater than the first value when the syncfound signal is not found during the predefined interval.

The apparatus can also include converting means, coupled to the detecting means, for receiving serial data and converting the serial data into parallel data. It also includes means, coupled to the converting means and the latching means, for re-aligning the parallel data on the basis of the shift signal.

BRIEF DESCRIPTION OF THE DRAWINGS

These and other features of the invention will be understood more clearly from the following description, read in conjunction with the drawings, in which.

DETAILED DESCRIPTION OF THE PREFERRED EMBODIMENTS

In the following description of presently preferred embodiments, it will be assumed that the invention is used to reconstitute parallel data consisting of 8-bit bytes or words. It will be apparent to one of ordinary skill in the art, however, that other parallel data widths may be used. It will also be assumed that the parallel data values will be given in hexadecimal (or binary) form notation where the most significant bit of the word occurs first in time in the serial data stream. Moreover, it will be assumed that the sync pattern is 16 bits or two bytes long, with the pattern $(0C, AF)_h$ or $(00001100, 10101111)_2$. It will be apparent to one of ordinary skill in the art that other sync lengths or patterns may be utilized.

Figure 1:
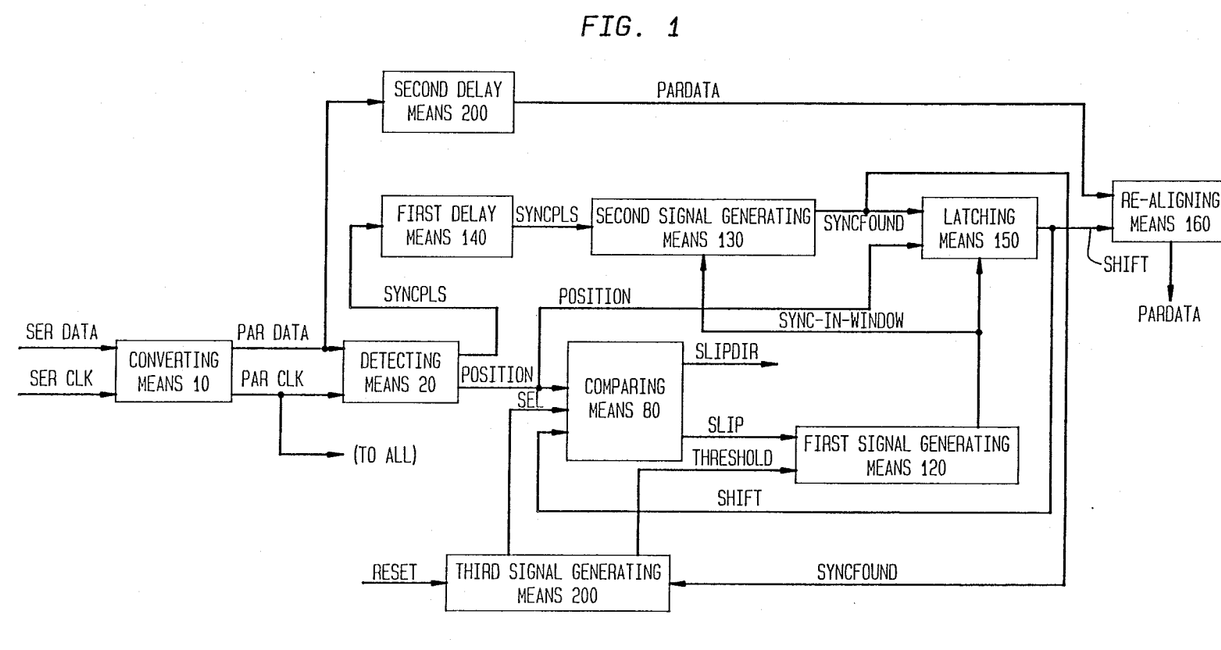
FIG. 1 is a functional block diagram of a presently preferred embodiment of an apparatus for sync detection according to the present invention.

FIG. 1 is a block diagram of one embodiment of a sync detection circuit according to the present invention. The embodiment of FIG. 1 includes a converting means 10 which receives serial digital data and a serial clock signal from, for example, a reproducing head of a digital tape recorder. The converting means 10 converts this data into a parallel form, and generates a parallel clock signal which is supplied to other components of the circuit. The converting means 10 performs conversion of serial to parallel data in a "free running" mode which results in randomly phased, or randomly-aligned, words, that is, words formed without regard to the alignment of byte boundaries in the original parallel data. The converting means 10 may, for example, comprise a shift register operating in a conventional manner.

In the embodiment shown, the converting means 10 operates at a serial clock rate. The other means described below, however, operate at a parallel clock rate.

A sync pattern of the type assumed may have any one of eight different positions or alignments in the parallel data stream, relative to the word boundaries. A detecting means 20 detects the sync pattern in one of these eight possible alignments. Whenever a sync pattern is detected, the detecting means 20 outputs a sync signal and a position signal indicating the particular alignment detected.

A comparing means 80 calculates the difference, in serial bit positions, between where a sync pattern is detected and where it is expected, based on a previous occurrence of the sync pattern. Of course, if the sync pattern is the first encountered after some interruption in operation such as would be indicated by generation of a reset signal, then the expected position is not based on a previous occurrence of the sync signal, there being none. As will be explained below, however, in such cases the circuit operates in a mode in which it will accept as valid the first sync pattern encountered, regardless of position. Upon detecting this first sync pattern, the circuit reverts to a mode in which an expected position is based on the position of this initially-detected occurrence.

In the presently preferred embodiment, the comparing means 80 outputs a 5-bit code indicating the direction and magnitude of the amount by which the sync pulse position deviates from its expected position, the "sync slip", in bit positions. It does so by comparing the position signal with an expected position signal. In a preferred embodiment, this expected position signal is a concatenation of a 2-bit select signal indicating in which word the beginning of the sync signal is located and a 3-bit shift signal indicating the expected alignment of the sync pattern with respect to the word boundaries. These signals are developed by means which will be described below.

The comparing means 80 calculates the "sync slip" of any sync pattern whose beginning occurs within a 3-word range. The middle word of this range is that within which the beginning of the sync pattern is expected. The maximum sync slip magnitude is 15 bits, and may be negative or positive. This is encoded by a 4-bit slip magnitude plus a slip direction bit. If the beginning of the sync pulse occurs outside of the 3-word interval, the sync slip magnitude is forced a maximum value of 15.

The comparing means 80 receives a 2-bit select signal which indicates the location of the word where the beginning of the sync pulse is expected. More precisely, the signal is caused to assume a value of two at the word or count in which the beginning of the sync pulse is expected, a value of one in the preceding count, a value of three in the following count, and zero in all other counts. This particular scheme simplifies the subsequent comparing means calculations; other schemes could be used. The comparing means 80 also receives a shift signal which is a 3-bit position signal which has been latched after having been identified as encoding the alignment of a sync pulse with respect to the word boundaries. The precise manner in which the shift signal is generated will be described more fully below.

The slip magnitude signal is applied to a first signal generating means 120. The first signal generating means 120 compares the slip magnitude from the comparing means 80 to a window value determined in accordance with a threshold signal, means for the generation of which will be described below. If the slip is determined to be within the window, the first signal generating means 20 generates a sync-in-window signal. The sync-in-window signal is applied to second signal generating means 130. Second signal generating means 130 produces a syncfound signal in response to receipt of both the sync-in-window signal and the sync signal from the detecting means 20. The second signal generating means might be implemented, for example, with an AND gate.

It may be necessary to delay propagation of the sync signal to match the processing delay in the comparing means 80 and first signal generating means 120. This delay may be effected by means incorporated into the detecting means or the second signal generating means, or may be an independent circuit such as first delay means 140 as depicted in FIG. 1.

The syncfound signal, a pulse indicating that a valid sync pattern has been found, is applied to the latching means 150. This causes the latching means 150 to latch the 3-bit position code. The latched 3-bit position code constitutes the shift code. The shift code is applied to the re-aligning means 160.

The re-aligning means 160 is preferably a funnel shifter circuit which is a simple form of a barrel shifter. It outputs, in the example being discussed, an 8-bit field selected from one of 8 positions out of 15 input data bits.

Figure 2:
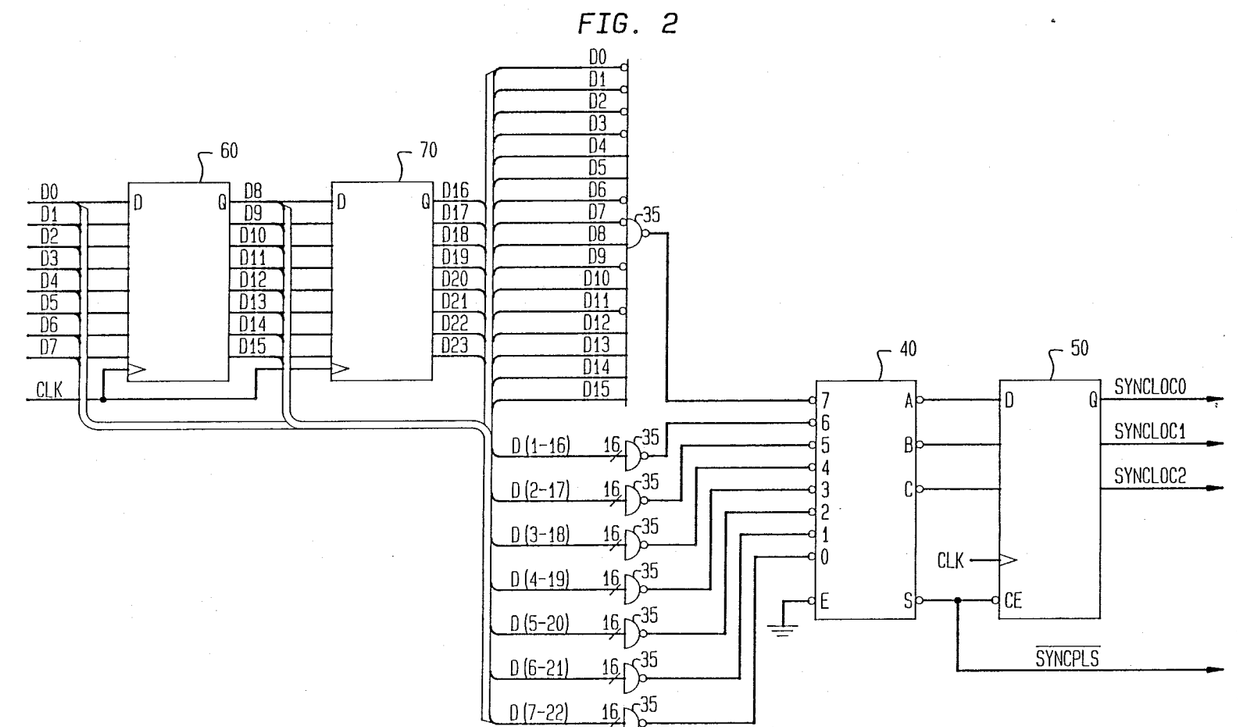
FIG. 2 is a presently preferred implementation of the detecting means shown in FIG. 1.

FIG. 2 shows a particular implementation of the detecting means 20. It includes eight 16-input NAND gates 35. Each NAND gate 35 detects the sync pattern in a respective one of the eight alignments. These gates may be in the form of discrete logic gates, programmable logic arrays, or integrated in a single LSI chip. A priority encoder 40 encodes the eight possible positions and produces a 3-bit position signal. An output latch 50 retains the value of the 3-bit code. The circuit also includes first and second latches 60 and 70 to provide for simultaneous presentation of three bytes to the logic gates 35. The specific operations of each of these elements will be apparent to one of ordinary skill in the art. Priority encoder 40 may be an IC type 74148 priority encoder, output latch 50 may be an IC type 74377 D-type flip-flop, and first and second latches 60 and 70 may be IC type 74374 octal D-type flip-flops.

Figure 3:
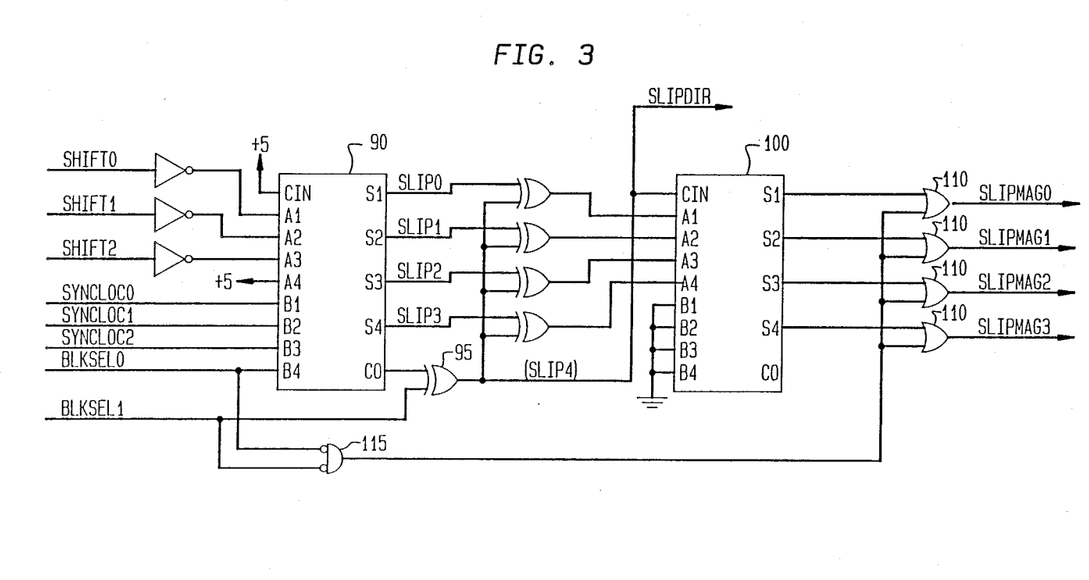
FIG. 3 is a presently preferred implementation of the comparing means depicted in FIG. 1.

FIG. 3 shows a particular implementation of the comparing means 80. The comparing means 80 includes a first adder 90 and a second adder 100. Calculation is performed in two steps. In the first step, the first adder 90 calculates the difference between two numbers using a two's complement algorithm producing a 5-bit representation of the sync slip in two's complement form. In the second step, the second adder 100 converts the slip signal to a sign plus 4-bit magnitude form. It may be necessary to reclock intermediate results of this calculation to limit propagation delay. The registers which would be used to perform the reclocking are omitted in FIG. 3 for the sake of clarity, but their implementation would be apparent to one of ordinary skill in the art and would not alter the principle of operation of the circuit.

One quantity in the calculation, the minuend, is a composite 5-bit signal whose binary representation is a concatenation of the 2-bit select signal (blksel1, blksel0) and the 3-bit position signal (syncloc2, syncloc1, syncloc0). The resulting quantity (blksel1, blksel0, syncloc2, syncloc1, syncloc0), is applied as one addend to first adder 90. The second addend is a concatenation of (01) and the inverse of 3-bit shift signal (shift2, shift1, shift0). This quantity (0, 1, shift2, shift1, shift0), together with a binary 1 supplied to the adder carrying-in input, constitutes the two's complement of the subtrahend in the calculation, (1, 0, $\overline{shift2}$, $\overline{shift1}$, $\overline{shift0}$), which is a concatenation of (01) and the 3-bit shift signal. The first adder 90 may be a 4-bit adder with an extra exclusive OR gate 95 to extend it to 5 bits, as shown. For example, the 4-bit adder may be IC type 74283 full adder. It would be apparent to one of ordinary skill in the art, however, that other adder implementations may be used without altering the principles of operation of the invention.

The 5-bit two's complement result is within the range of plus or minus 15 inclusive, provided the beginning of the sync pulse occurs within the above-mentioned 3-count interval. The remaining two's complement value of negative 16 can occur only if the sync pulse occurs outside of the interval.

The second adder 100 in FIG. 3 performs conversion to sign plus magnitude form. If the leading bit of the slip signal is 0, the two's complement quantity is 0 or positive, and the second adder 100 will have no effect. If the leading bit of the slip signal is 1, the two's complement quantity is negative, which causes the second adder 100 to invert the remaining bits and increment the resulting quantity by 1. Thus, the second adder 100 outputs the 4-bit magnitude.

For example, consider Table 1, which presents calculations for the case in which the shift signal has the value (000).

TABLE 1

| Minuend | Difference (Two's complement) After | Decimal Equivalent Conversion |
|---|---|---|
| 00000 | 10000 | −15* |
| 00001 | 10001 | −15 |
| 00010 | 10010 | −14 |
| 00011 | 10011 | −13 |
| 00100 | 10100 | −12 |
| 00101 | 10101 | −11 |
| 00110 | 10110 | −10 |
| 00111 | 10111 | −9 |
| 01000 | 11000 | −8 |
| 01001 | 11001 | −7 |
| 01010 | 11010 | −6 |
| 01011 | 11011 | −5 |
| 01100 | 11100 | −4 |
| 01101 | 11101 | −3 |
| 01110 | 11110 | −2 |
| 01111 | 11111 | −1 |
| 10000 | 00000 | 0 |
| 10001 | 00001 | +1 |
| 10010 | 00010 | +2 |
| 10011 | 00011 | +3 |
| 10100 | 00100 | +4 |
| 10101 | 00101 | +5 |
| 10110 | 00110 | +6 |
| 10111 | 00111 | +7 |
| 11000 | 01000 | +8 |
| 11001 | 01001 | +9 |
| 11010 | 01010 | +10 |
| 11011 | 01011 | +11 |
| 11100 | 01100 | +12 |
| 11101 | 01101 | +13 |
| 11110 | 01110 | +14 |
| 11111 | 01111 | +15 |

*original magnitude of 16 shifted to 15 (see below)

The subtrahend is (10000) and its two's complement, which will be added to the minuend, is also (10000). If the minuend, which, it will be recalled, is (blksel1, blksel0, syncloc2, syncloc1, syncloc0) is, for example (10110), then the resulting two's complement difference is (10110), which upon conversion to sign plus magnitude, has a decimal value of −10.

The computations for other values of the shift signal are equally straightforward. In fact, they may be read from Table 1 if one takes into account that each increment in the value of shift select signal shifts the second and third columns of Table 1 downward one row, with the bottom row rotating to the top.

A special case of conversion occurs if the two's complement number has a value of −16 (10000 binary). This quantity has no proper representation as a sign plus 4-bit magnitude number. The second adder 100 will output a result of −0 (10000 binary). In order to counteract this, OR gates 110 are used in conjunction with AND gate 115 to force the magnitude of the slip signal to be 15 when the beginning of the sync pulse occurs outside the previously-mentioned 3-count interval.

Figure 4:
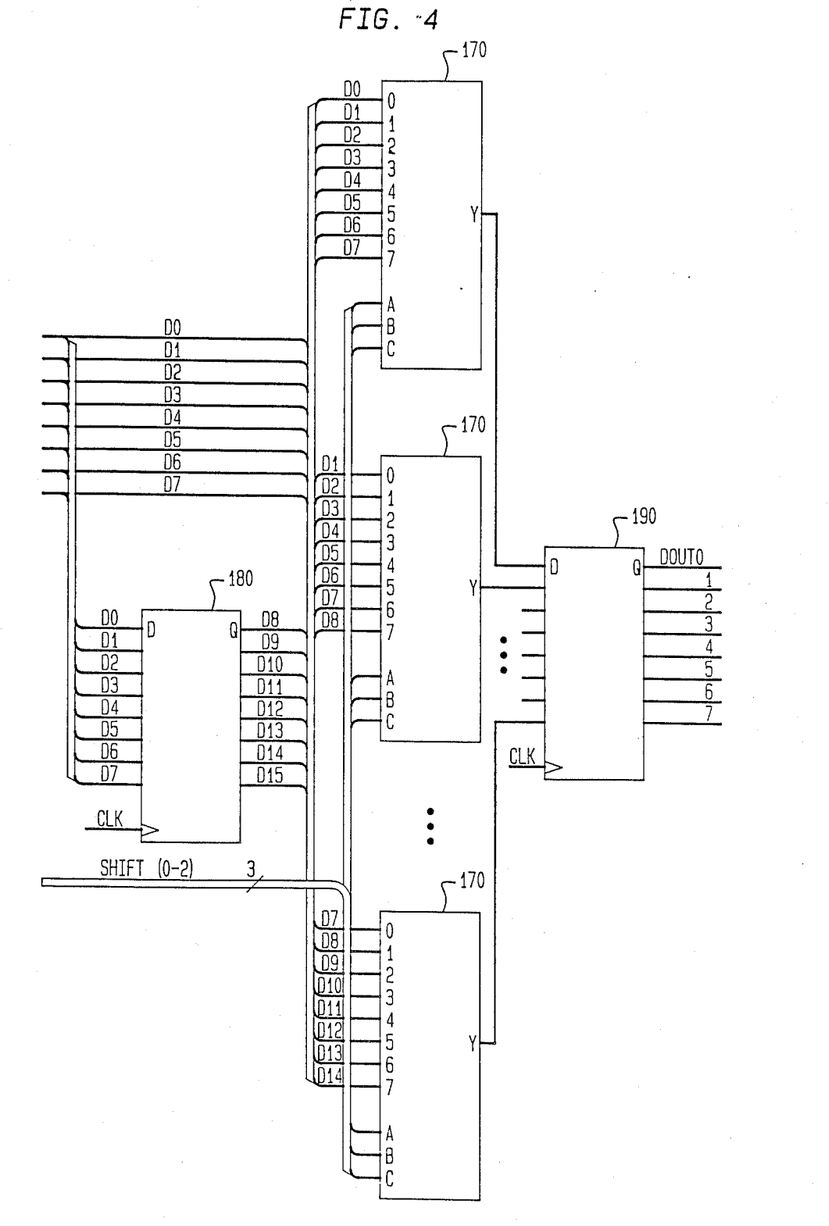
FIG. 4 is a presently preferred implementation of the re-aligning means shown in FIG. 1.

FIG. 4 shows a particular implementation of the realigning means according to the present invention. It includes an array of 8-1 multiplexers 170, numbering 8 in all. It also includes an input latch 180 and an output latch 190. The input latch 180 assures simultaneous presentation of 2 bytes to the multiplexer array. The multiplexers may be in the form of discrete logic, programmed logic arrays, or integrated in LSI format. It may be necessary to delay the parallel data between the converting means and the re-aligning means to compensate for the delay in the detecting means, comparing means, first signal generating means, etc. This delay can be accomplished within converting means 10, within the re-aligning means 160, or in a separate means such as second delay means 195 as depicted in FIG. 1. The re-aligning means takes the data, properly delayed, and shifts it in accordance with the shift signal from the latching means 150. The data which leaves the re-aligning means 160 is then properly aligned with respect to the detected synchronization signal.

Figure 5:
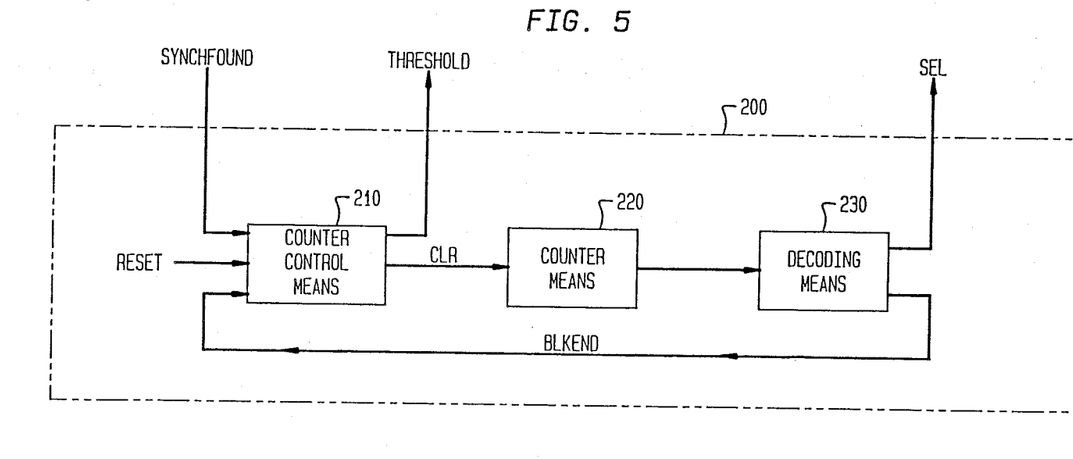
FIG. 5 is a presently preferred implementation of the third signal generating means shown in FIG. 1.

The select signal and threshold signal are generated by third signal generating means 200. As shown in FIG. 5, third signal generating means preferably includes a counter control means 210, a counter means 220, and a decoding means 230. The counter control means 210 is reset by a signal generated at the beginning of a data sequence, for example, when a reproducing head comes on tape in a digital tape recorder. Receipt of the reset signal defines a "reset" or "window open" state for the counter control means 210. In this state, the counter means 220 is forced to remain cleared, and the threshold signal assumes its maximum value of 15 (1111 binary).

This maximum threshold signal is applied to the first signal generating means 120. This defines a "window open" state in which the output of the comparing means 80 is immaterial. The first signal generating means 120 compares the bit slip magnitude from the comparing means 80 to the threshold value. In the "window open" state in which the threshold is at the maximum possible value, the output of the first signal generating means 120, that is, the sync-in-window signal, is always high. Thus, a sync pattern will be recognized in this state regardless of its location, and the sync-in-window signal and syncfound signal are assuredly generated. The sync pulse from detecting means 20, properly delayed to match the processing delay in the other circuitry, is applied to second signal generating means 130 along with the output of the first signal generating means 120. Second signal generating means then generates a syncfound signal pulse indicating that a valid sync pattern has been found. Besides being applied to the latching means 150 as described above, the syncfound signal is also applied to the third signal generating means 200.

This causes the third signal generating means 200 to transition to a non-reset or "window closed state", enabling the counter means 220 to increment by counting parallel clock pulses. In this state, the circuit will recognize only a sync pattern within a narrow "window" about its expected location, based on the predetermined, normal distance between sync patterns. The size of the window is set by the threshold value, which is less than the maximum value of 15 used in the window-open state. Typically, the width of the window in the window-closed state will be small compared to the length of the sync pattern in bits.

The counter control means 210 defines the sync acquisition strategy, including the size of the window once sync is acquired and the flywheeling to be performed, if any, when a block with a missing sync is encountered. For the purposes of describing the invention, it will be assumed that it is desired to implement a control strategy that will flywheel through a maximum of one block with a missing sync. Moreover, it is assumed that it is desired to implement an embodiment in which the normal window is plus or minus 4 bits, which is widened to plus or minus 8 bits when flywheeling through a block with a missing sync pattern. It will be apparent to one of ordinary skill in the art, however, that other control strategies are possible. The central feature is that when a sync pattern is recognized the counter be reset and enabled, in order to form a window for the next sync pattern, with the threshold (window size) less than 15 in the window closed state.

Figure 6:
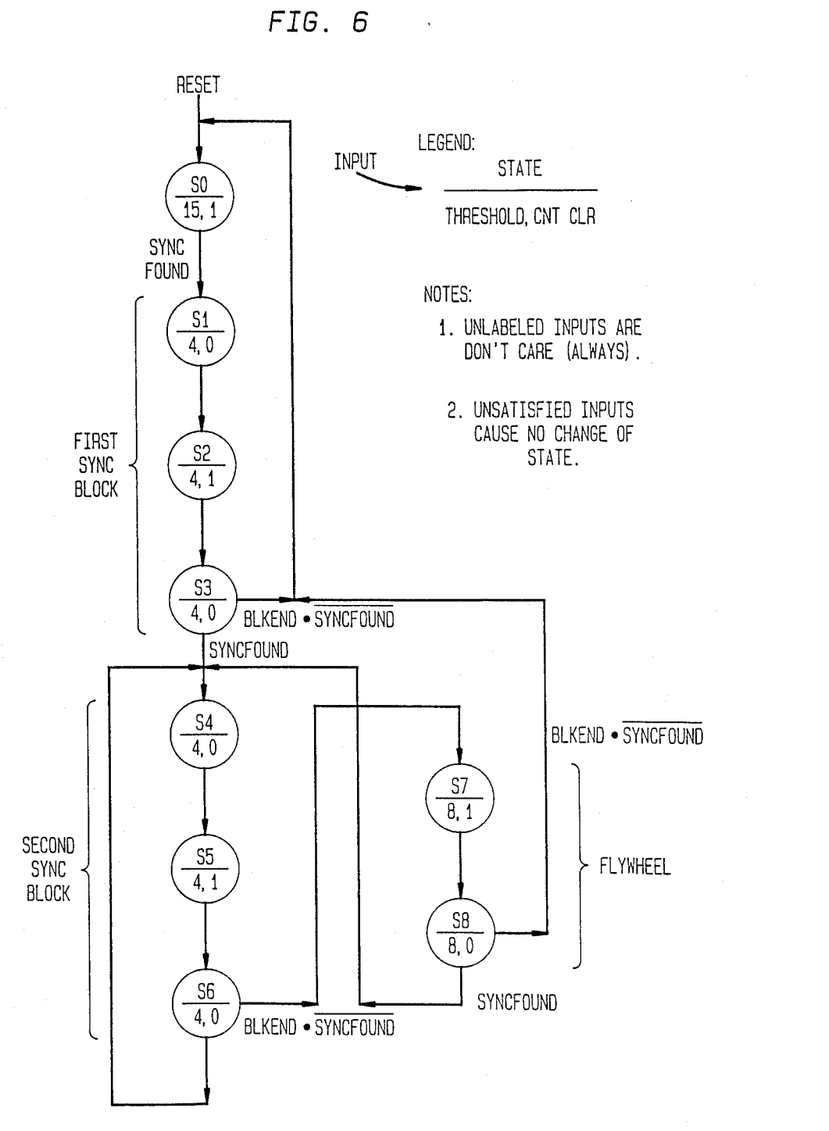
FIG. 6 is a state diagram of an exemplary mode of operation of the implementation of the third signal generating means shown in FIG. 4.

FIG. 6 is a state transition diagram of the counter control means 220 incorporating the assumed control algorithm. This algorithm may be implemented in a variety of ways, for example, with a programmable read only memory or programmable logic array. In most instances, three control inputs will suffice: a reset signal, a syncfound signal, and a blkend signal. The blkend signal is decoded from the counter means 220 to appear normally in the clock period following that in which the syncfound signal occurs. The reset signal is generated upon the beginning of data acquisition, for example, when the tape head begins to read data from magnetic tape. The syncfound signal is generated as described above.

As shown, the counter control means 210 is initially in the reset state, S0. In this state, the threshold is at its maximum value of 15, and the counter means 220 is continuously cleared. When a syncfound pulse occurs, control means 210 passes through states S1, S2, and S3 in succession. In state S2 counter 220 is cleared and thereafter begins incrementing as it counts parallel clock pulses. During these states the window threshold is reduced to four, for example. If the blkend pulse occurs without a syncfound pulse having occurred, the first sync is assumed to have been spurious and the circuit returns to state S0. This can occur, for example, if the first recognized sync pattern occurred in the data. If the syncfound pulse occurs in state S3, then the circuit moves through states S4, S5 and S6 in succession. The counter means 220 is cleared in state S5 and the threshold remains at 4. The circuit continues to cycle among states S4, S5 and S6 as long as sync patterns are found within the plus or minus 4-bit window. If it should happen that a blkend pulse occurs before the occurrence of a syncfound pulse, then it is assumed that an error affecting the sync pattern has occurred, and the circuit moves to states S7 and S8 in succession. State S7 clears the counter means 220, and the threshold is increased to 8. If the next syncfound pulse occurs the circuit reverts to state S4. If another blkend pulse occurs, however, before the occurrence of a syncfound pulse, the circuit returns to reset state S0.

Other control strategies are possible. The circuit may be designed not to try to flywheel through blocks with a missing sync, or to try to flywheel through more than one block. Various threshold values may be assigned, provided that the threshold of the reset state is 15, and the remaining states have smaller thresholds.

One of ordinary skill in the art will appreciate from the foregoing that the present invention can be implemented using almost exclusively parallel logic. Such an implementation reduces power consumption and cost, and lends itself well to large scale integration. At the same time, the present invention offers a highly responsive and flexible sync detection scheme.

The subject invention has been described above in terms of several specific embodiments. It will be understood, however, that these embodiments have been used merely to illustrate the principles of the invention, and it is possible that the principles of the invention could be implemented in embodiments other than those specifically described above. For example, the number of bits in the parallel form of the data may be greater or less than 8. The sync word length may be other than 16 bits, and its pattern may differ from that assumed herein. The comparing means may be implemented by a programmable read only memory of suitable size rather than by a full adder. Other algorithms or strategies for the flywheel counter control means 210 may be implemented. It will also be apparent to one of ordinary skill in the art that all or part of the logic, with the possible exception of the high speed serial to parallel converter, may be implemented in a gate array or other type of LSI circuitry. It will therefore be appreciated that the invention is not limited to the embodiments which have been specifically set forth above, but is instead, fully commensurate in scope with the following claims.

What is claimed is:

1. An apparatus for locating a sync pattern in a digital data stream, comprising:
    means, responsive to said digital data stream, for detecting the sync pattern, for generating a first signal in response to a condition in which said sync pattern occurs at a position in said digital data stream within a window about an expected position of said sync signal and for setting a width of said window in accordance with a value of a threshold signal; and
    means, responsive to said first signal for generating said threshold signal to have (a) a first value causing said window to have a first width in response to a condition in which said first signal occurs within a predefined interval, and (b) a second value causing said window to have a second width greater than said first width in response to a condition in which said first signal does not occur within said predefined interval.

2. An apparatus as claimed in claim 1, further comprising:
    means, responsive to said detecting means, for generating a shift signal indicative of a location of a preceding sync pattern, wherein said detecting means is additionally for setting said expected position in response to said shift signal and a select signal; and wherein
    said generating means is additionally for generating said select signal.

3. An apparatus as claimed in claim 1, wherein, in response to said threshold signal having said second value, said detecting means sets said width of said window at a value not less than a greatest possible amount by which said position at which said sync pattern occurs can deviate from said expected position, so that said first signal is generated in response to any sync pattern.

4. An apparatus for locating a sync pattern, comprising:
    converting means, for receiving serial data, and for converting said serial data into parallel data;
    means, arranged to receive said parallel data, for detecting said sync pattern in said parallel data, for generating a sync pulse in response to the detection of said sync pattern, for determining an actual position of said sync pattern, and for generating a position signal indicative of said actual position;
    means, arranged to receive said position signal, for comparing said actual position with an expected position indicated by an expected position signal, and for generating a slip signal indicative of a degree of slip between said expected position and said actual position;
    first signal generating means, arranged to receive said slip signal, for generating a sync-in-window signal when said degree of slip is within an acceptable window;
    second signal generating means, coupled to said detecting means and said first signal generating means, for generating a syncfound signal in response to the generation of both said sync pulse and said sync-in-window signal;
    means, arranged to receive said syncfound signal and said position signal, for latching said position signal to generate a shift signal in response to said syncfound signal;
    third signal generating means, coupled to said first signal generating means, said second signal generating means, and said comparing means, and responsive to said syncfound signal, for generating a select signal indicative of said expected position, for generating a threshold signal having a value corresponding to a width of said acceptable window, for supplying said threshold signal to said first signal generating means to set said width, and for causing said threshold signal to assume (a) a first value if said syncfound signal has been generated in a predefined interval, and (b) to assume a second value greater than said first value if said syncfound signal is not generated during said predefined interval; and
    means responsive to said latching means and said third signal generating means, for generating said expected position signal on the basis of said shift signal and said select signal.

5. An apparatus as claimed in claim 4, wherein said detecting means is for generating a position signal in the form of a 3-bit binary signal.

6. An apparatus as claimed in claim 5, wherein said third signal generating means comprises:
    a counter means for counting a number of words between beginnings of data blocks;
    decoding means, arranged to receive an indication of said number of words between said data blocks from said counter means and for producing said select signal at least partially on the basis of said indication, and for generating a blkend signal; and counter control means, responsive to said syncfound signal and said blkend signal, for selectively clearing said counter means, and for generating said threshold signal.

7. An apparatus as claimed in claim 4 wherein said second signal generating means comprises an AND gate.

8. An apparatus as claimed in claim 4 wherein said comparing means comprises;

means for determining a difference between two quantities, said first quantity related to the value of the shift signal, and the second quantity being related to the value of the select signal and the position signal; and means for generating a signal indicative of the magnitude of the difference between said first and second quantity.

9. An apparatus as claimed in claim 4, further comprising:

means, coupled to said converting means and said latching means, for re-aligning said parallel data on the basis of said shift signal.

10. An apparatus as claimed in claim 9 wherein said third signal generating means is for generating a threshold signal having a third value between said first value and said second value, inclusively, if said blkend signal occurs before said syncfound signal.

11. A method of locating a sync pattern in a digital data stream, comprising the steps of:

detecting the sync pattern;

generating a first signal in response to a condition in which said sync pattern occurs at a position in said digital data stream within a window about an expected position of said sync pattern and for setting a width of said window in accordance with a value of a threshold signal; and generating said threshold signal to have (a) a first value causing said window to have a first width in response to a condition in which said first signal occurs within a predefined interval, and (b) a second value causing said window to have a second width greater than said first width in response to a condition in which said first signal does not occur within said predefined interval.

12. A method as claimed in claim 11, further comprising the steps of:

generating a shift signal indicative of a location of a preceding sync pattern;

setting said expected position in response to said shift signal and a select signal; and generating said select signal.

13. A method as claimed in claim 11, comprising the additional step of:

setting, in response to said threshold signal having said second value, said width of said window at a value not less than a greatest possible amount by which said position at which said sync pattern occurs can deviate from said expected position, so that said first signal is generated in response to any sync pattern.

14. A method of locating a sync pattern, comprising the steps of:

converting serial data into parallel data;

detecting said sync pattern in said parallel data;

generating a sync pulse in response to the detection of said sync pattern;

determining an actual position of said sync pattern as detected;

generating a position signal indicative of said actual position;

comparing said actual position with an expected position;

generating a slip signal indicative of a degree of slip between said expected position and said actual position;

generating a sync-in-window signal when said degree of slip is within an acceptable window; and generating a syncfound signal in response to the generation of both said sync pulse and said sync-in-window signal.

15. An apparatus for locating a sync pattern in a stream of serial data comprising:

means, responsive to said serial data, for dividing said serial data into parallel data;

means, responsive to said parallel data, for detecting sync patterns in said parallel data and for generating a position signal for each detected sync pattern indicative of an alignment of said each sync pattern with respect to word boundaries in said parallel data;

means for determining whether a detected sync pattern is valid;

means, responsive to said determining means, for latching a position signal of said sync pattern if said sync pattern is determined to be valid; and means, responsive to said determining means, for counting a number of words in said parallel data occurring since a most recent previous occurrence of a valid sync pattern, and for generating a select signal indicative of words occurring within a predetermined range of an expected count of a beginning of a next sync pattern;

said determining means comprising means for determining validity of a current sync pattern on the basis of the latched position signal of the most recent previous valid sync signal, a current position signal of said current sync pattern, and said select signal.

16. An apparatus as claimed in claim 15 wherein said determining means is for algebraically combining said latched position signal, current position signal, and select signal to form a slip signal.

17. An apparatus as claimed in claim 16 wherein said counting means comprises means for generating a threshold signal, and wherein said determining means further comprises means for comparing a magnitude of said threshold signal and said slip signal, said current sync pattern being determined valid if said magnitude of said slip signal is not greater than said magnitude of said threshold signal.

18. An apparatus as claimed in claim 17 wherein said counting means comprises threshold signal magnitude changing means for causing said threshold signal to have a first magnitude of a sync pattern is determined valid within a predetermined number of counts, and a second magnitude greater than a first magnitude of no sync pattern is determined valid within said predetermined number of counts.

19. A method of locating a sync pattern in a stream of serial data, comprising the steps of:

(a) dividing said serial data into parallel data;

(b) detecting a first sync pattern in said parallel data;

(c) generating a position signal for said first sync pattern, said position signal being indicative of an alignment of said sync pattern with respect to word boundaries in said parallel data;
(d) latching a position signal of said first sync pattern;
(e) counting a number of words in said parallel data occurring since said first sync pattern;
(f) generating a select signal indicative of words occurring within a predetermined range of an expected count of a beginning of a second sync pattern;
(g) detecting a second sync pattern in said parallel data;
(h) generating a current: position signal for said second sync pattern;
(i) determining whether said second sync pattern is valid based on said latched position signal, said current position signal, and said select signal.

20. A method as claimed in claim 19, comprising an additional step (j) after said step (i) of latching said position signal of said second sync pattern if said second sync pattern is determined to be valid in said step (i), and restarting said counting in said step (e) to repeat said steps (e)–(j) using signals pertaining to said second sync pattern as those pertaining to said first sync pattern.

21. A method as claimed in claim 19 wherein said determining step comprises the step of performing an algebraic manipulation of said latched position signal, said current position signal, and said select signal to form a slip signal.

22. A method as claimed in claim 21, wherein said determining step additionally comprises the step of comparing a magnitude of said slip signal with a predetermined threshold value.

23. A method as claimed in claim 22 wherein said predetermined threshold value is varied in accordance with whether a valid sync pattern has been determined with a predefined number of counts.

* * * * *